(12) United States Patent
Shibayama et al.

(10) Patent No.: US 7,926,816 B2
(45) Date of Patent: Apr. 19, 2011

(54) SEALING DEVICE WITH TONE WHEEL

(75) Inventors: Masanori Shibayama, Okayama (JP);
Hiroshi Seno, Okayama (JP)

(73) Assignee: Uchiyama Manufacturing Corp.,
Okayama-shi, Okayama (JP)

( * ) Notice: Subject to any disclaimer, the term of this patent is extended or adjusted under 35 U.S.C. 154(b) by 408 days.

(21) Appl. No.: 11/920,514

(22) PCT Filed: May 22, 2006

(86) PCT No.: PCT/JP2006/310113
§ 371 (c)(1),
(2), (4) Date: Aug. 5, 2008

(87) PCT Pub. No.: WO2006/126469
PCT Pub. Date: Nov. 30, 2006

(65) Prior Publication Data
US 2009/0102134 A1   Apr. 23, 2009

(30) Foreign Application Priority Data
May 23, 2005   (JP) .................................. 2005-149034

(51) Int. Cl.
*F16J 15/32* (2006.01)
(52) U.S. Cl. .................... 277/551; 277/572; 277/574
(58) Field of Classification Search ............... 277/353, 277/562, 551, 572, 573, 574
See application file for complete search history.

(56) References Cited

U.S. PATENT DOCUMENTS

| | | | |
|---|---|---|---|
| 4,434,985 A * | 3/1984 | Sonnerat | 277/353 |
| 5,431,413 A | 7/1995 | Hajzler | |
| 6,170,992 B1 * | 1/2001 | Angelo et al. | 384/477 |
| 6,637,754 B1 * | 10/2003 | Ohtsuki et al. | 277/549 |
| 7,056,028 B2 * | 6/2006 | Hosoda et al. | 384/486 |
| 2003/0230849 A1 * | 12/2003 | Vignotto et al. | 277/349 |
| 2007/0090604 A1 * | 4/2007 | Shibayama et al. | 277/349 |

FOREIGN PATENT DOCUMENTS

| | | |
|---|---|---|
| JP | 53-101155 | 8/1978 |
| JP | 6-281018 | 10/1994 |
| JP | 2002-62305 | 2/2002 |

(Continued)

*Primary Examiner* — Shane Bomar
*Assistant Examiner* — Robert E Fuller
(74) *Attorney, Agent, or Firm* — Bacon & Thomas, PLLC

(57) ABSTRACT

A sealing device with a tone wheel formed to seal between a fixed side member and a rotating side member. A slinger comprises a fitting cylindrical part fitted to the rotating side member and a flanged part radially extendedly formed at one end part of the fitting cylindrical part positioned on the outer side of a sealed portion. The outer surface of the flanged part positioned on the outer side of the sealed portion comprises a tone wheel stuck surface on which the tone wheel formed of a magnetic ring is stuck integrally with each other and an extended surface on which the tone wheel is not stuck and extended to the fixed side member. The sealing device is characterized in that a core comprises at least a fitting cylindrical part fitted to the fixed side member, the one end part of the fitting cylindrical part positioned on the outer side of the sealed portion is projected from the outer surface of the flanged part of the slinger to the outside, a part of the seal lip part is formed to be brought into elastically slidable contact with the extended surface of the slinger from the outside, and the flanged part is held by the seal lip part and the other seal lip part from the inside and the outside.

2 Claims, 4 Drawing Sheets

FOREIGN PATENT DOCUMENTS

| | | |
|---|---|---|
| JP | 2002-206549 | 7/2002 |
| JP | 2003-294048 | 10/2003 |
| JP | 2004-36817 A | 2/2004 |
| JP | 2004-61271 | 2/2004 |
| JP | 2004-332938 | 11/2004 |

* cited by examiner

SEALING DEVICE WITH TONE WHEEL

TECHNICAL FIELD

The present invention relates to a sealing device with tone wheel interposed into a necessary portion to be sealed between a stationary member and a rotary member like a bearing unit of a wheel suspension of vehicles, more particularly relates to a sealing device with tone wheel constructed such that a slinger is assembled with a core member for fixedly holding an elastic seal member which elastically and slidably contacts with the slinger, and the slinger is integrally attached with a tone wheel which constitutes a magnetic encoder with a magnetic sensor fixed to the side of the stationary member.

BACKGROUND OF THE INVENTION

Such a sealing device with a tone wheel or a sealing device without a tone wheel has been disclosed in the following: JP-A-2001-65704 (Patent Document 1), JP-A-2003-106464 (Patent Document 2), and (Patent Document 3). The Patent Document 1 discloses a sealing device comprising a first sealing plate and a second sealing plate, one of them being a slinger, which have an L-shaped section and include a cylindrical wall and an upright wall (flange like portion) and a seal lip. The first and the second sealing plates face each other, the tip end of the upright wall of the first sealing plate and the cylindrical wall of the second sealing plate stand face to face with a small radial gap (labyrinth), and the outer side face of the upright wall is set back inwardly from the end face of the cylindrical wall of the second sealing plate.

The Patent Document 2 discloses a sealing device in which the tip ends of the second dust lips (seal lip) elastically and slidably contacting with the inside of a metal ring (slinger) are disposed close so as to face each other, so that the deterioration of shrink range caused by abrasion and settling can be compensated, thereby preventing the ingress of grist and dust into a closed space formed with two dust lips. Further, FIG. 1 of the Patent Document 2 shows an example wherein a part of the second seal portion contacts with the inside of the tip end portion of the outward flange (flange like portion) of the slinger.

The Patent Document 3 discloses an example of a sealing device, in which a permanent-magnetic encoder (tone wheel) is provided to the outer side surface of the ring plate portion of the slinger which constitutes a combined seal ring where the outer side surface of the encoder is covered with a non-magnetic cover plate. The seal ring is provided with an elastic member which has several seal lips all around the inner circumference end of the annular core member which has L-shaped section where the tip end of the seal lip which projects inward in the radial direction contacts with the outer circumference surface of the cylindrical portion which constitutes a slinger, and the tip end of the seal lip which projects to the side in the thrust direction contacts with the inner side surface of the circle ring portion which constitutes a slinger, both tip end of the seal lip contacting with the surface all around the circumference elastically by the elasticity of the seal lips themselves.

SUMMARY OF THE INVENTION

The sealing device of the Patent Document 1 teaches that the sealing performance can be improved by the above constitution without complicating the structure. However, because the above-mentioned labyrinth is provided, grist and dust and water easily enter the space surrounded with the first seal plate and the second seal plate from the labyrinth to be accumulated therein. If such condition is kept for a long time that grist and dust and water are accumulated in the space, the grist and dust and so on move in a slidably contacting portion of the seal lip and the slinger, thereby accelerating wear of the seal lip and deteriorating the durability.

The sealing device of the Patent Document 2 discloses that grist and dust and so on are prevented from entering the closed space between the second dust lips and the function of preventing the ingress of grist and dust can be kept for a long time. However, assuming that the outer annular body of metal to be provided outside of the sealing device does not exist, the function of preventing the ingress of grist and dust and so on is not achieved at the entrance of the space surrounded with the first sealing portion and the second sealing portion. As the result, when the grist and dust once enters the space, it moves to the portion where the dust lip and the outward flange of the slinger elastically and slidably contact with, thereby arising abrasion of the dust lip. FIG. 1 of the Patent Document 2 shows an example wherein a part of the second seal portion contacts with the inside of the tip end portion of the outward flange (flange like portion) of the slinger, as mentioned above. However, it does not describe its function nor suggest it elastically and slidably contacts. Therefore, if such prior art is applied to the sealing device with tone wheel of the present invention which is assembled with the slinger and the core member which fixedly holds the seal member elastically and slidably contacting with the slinger, there is still a problem of the above-mentioned durability and the improvement is highly requested.

Further, the sealing device of the Patent Document 3 has similar problems to the sealing device of the Patent Document 1 mentioned above, because the sealing device with tone wheel of the Patent Document 3 has the similar sealing structure. And also the sealing device with tone wheel of the Patent Document 3 has the following problems in the assembling process, where the seal ring and the slinger must be assembled separately in the sealing device, because the seal ring must be inserted (pushed) and fixed to the inner circumferential portion of the outer wheel (stationary member) at first, and the slinger with the encoder (tone wheel) must be then provided and fixed to the outer circumferential end portion of the inner wheel (rotary member). Thereby it has been required to make the assembling process easier. Moreover, the handling before the assembling process has been difficult because the seal ring and the slinger are handled separately as mentioned above.

The present invention is proposed in view of the above-mentioned problems and the object of the present invention is to provide a newly developed sealing device with tone wheel which keeps superior sealing performance, durability, and assembling efficiency with a simple structure.

The sealing device with tone wheel of claim 1 of the present invention comprises a slinger fixedly fitted into a rotary member, a core member fixedly fitted into a stationary member, and an elastic seal member attached to the core member, the elastic seal member having a plurality of seal lip portions elastically and slidably contacting with the slinger, thereby sealing a space between the stationary member and the rotary member. It is characterized in that the slinger has a fitting cylindrical portion to be fitted into the rotary member and a flange like portion extending in its radial direction from outer edge of the fitting cylindrical portion than the sealed portion, and the outer surface of the flange like portion than the sealed portion comprises an attached surface where the tone wheel made of a magnetic ring is attached, and an extended end face where the tone wheel is not attached, the extended end face extending to the direction of the stationary member, the core member has at least a fitting cylindrical portion to be fitted into the stationary member and the outer end of the fitting cylindrical portion than the sealed portion projects out of the outer surface of the flange like portion of the slinger, a part of the seal lip portion is formed so as to elastically and slidably contact with an extended end face of the slinger, and the flange like portion is clamped by one of the seal lip portion and the another seal lip portion from inside and outside thereof.

According to the sealing device with tone wheel of the present invention, the extended end face of the flange like portion of the slinger can be formed as a step portion which shifts closer to the sealed portion than the attached surface. Also according to the sealing device with tone wheel of the present invention, the base portion of the seal lip portion which elastically and slidably contacts with the extended end face can be formed so as to project outside relative to the outer surface of the tone wheel.

According to the objective apparatus to which the sealing device with tone wheel of claim 1 of the present invention is applied, the portion of the slinger and the core member which are positioned outside relative to the sealed portion are generally exposed to the exterior environment depending on the applied place. According to the present invention, a part of the lip portion is formed so as to elastically and slidably contact with the extended end face of the slinger, and the flange like portion is clamped by one of the seal lip portion and the another seal lip portion from inside and outside thereof. Therefore, there is no gap to allow earth and sand, water and grist and dust to be entered in the space surrounded with the slinger and the core member having the seal member when the members may be exposed to the exterior environment, thereby preventing acceleration of abrasion of the seal member located in the space because of the ingress of grist and dust and so on to a slidably contacting portion. Further, a part of the lip portion slidably contacts in an elastic condition with the extended end face of the slinger, so that the contacting force becomes strong, the ingress of grist and dust can be effectively prevented, and the durability of the sealing device is improved.

Also according to the sealing device with tone wheel of the present invention, the slinger and the elastic seal member are combined together, the outer end of the fitting cylindrical portion of the core member which is outside relative to the sealed portion projects out of the outer surface of the flange like portion of the slinger, and a part of the seal lip portion is formed so as to elastically and slidably contact with an extended end face of the slinger, thereby it is possible that the slinger and the core member provided with the elastic seal member are combined together at first in advance, then the sealing device can be pushed and fixed between the stationary member and the rotary member with an appropriate jig or a tool when the sealing device is assembled, so that the sealing device can be easily assembled.

When the extended end face of the flange like portion of the slinger is formed as a step portion which shifts closer to the sealed portion than the attached surface as mentioned in claim 2 of the present invention, the part of the seal lip portion which elastically contacts with the extended end face can be assembled without touching the tone wheel.

When the conventional sealing devices are contacted before being installed in the sealed portion, the sealing devices tend to stick to each other unfavorably due to the magnetic force which occurs between the metallic core member and the tone wheel which is made of the magnetic rubber.

However in the case that the base portion of the seal lip portion which elastically and slidably contacts with the extended end face is formed so as to project outside relative to the outer surface of the tone wheel of the present invention, the core member and the tone wheel do not touch each other, thereby the handling of the seal device becomes much easier. Also because the base portion of the seal lip portion is formed so as to project outside relative to the outer surface of the tone wheel, thereby the attack of the grist and dust which comes from outside is decreased even after the seal device is assembled, so that the durability of the seal device is improved.

DETAILED DESCRIPTION OF THE INVENTION

Figure 1:
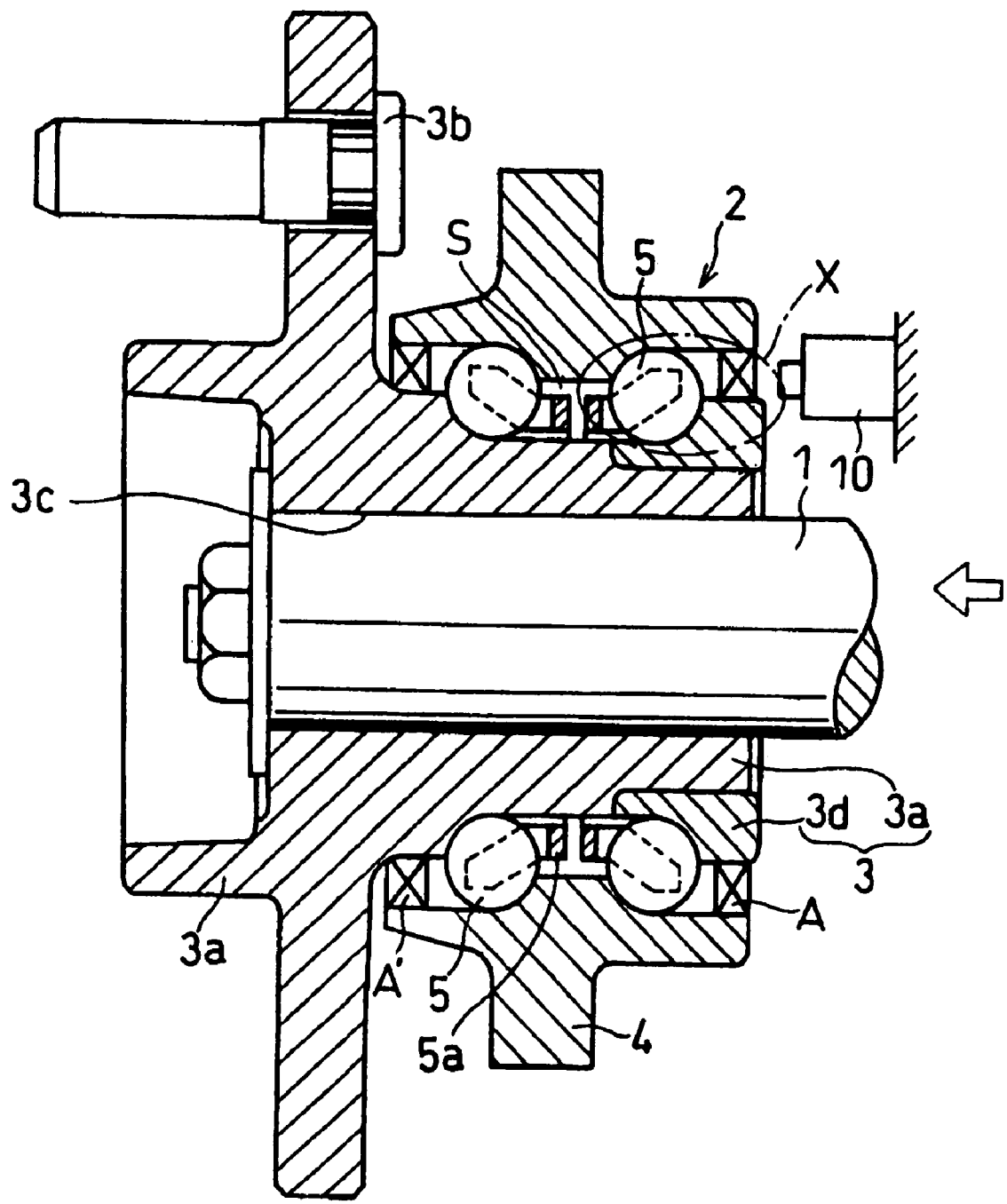
FIG. 1 is a sectional view showing an example of a bearing unit incorporated with a sealing device of one preferable embodiment of the present invention.
Figure 3:
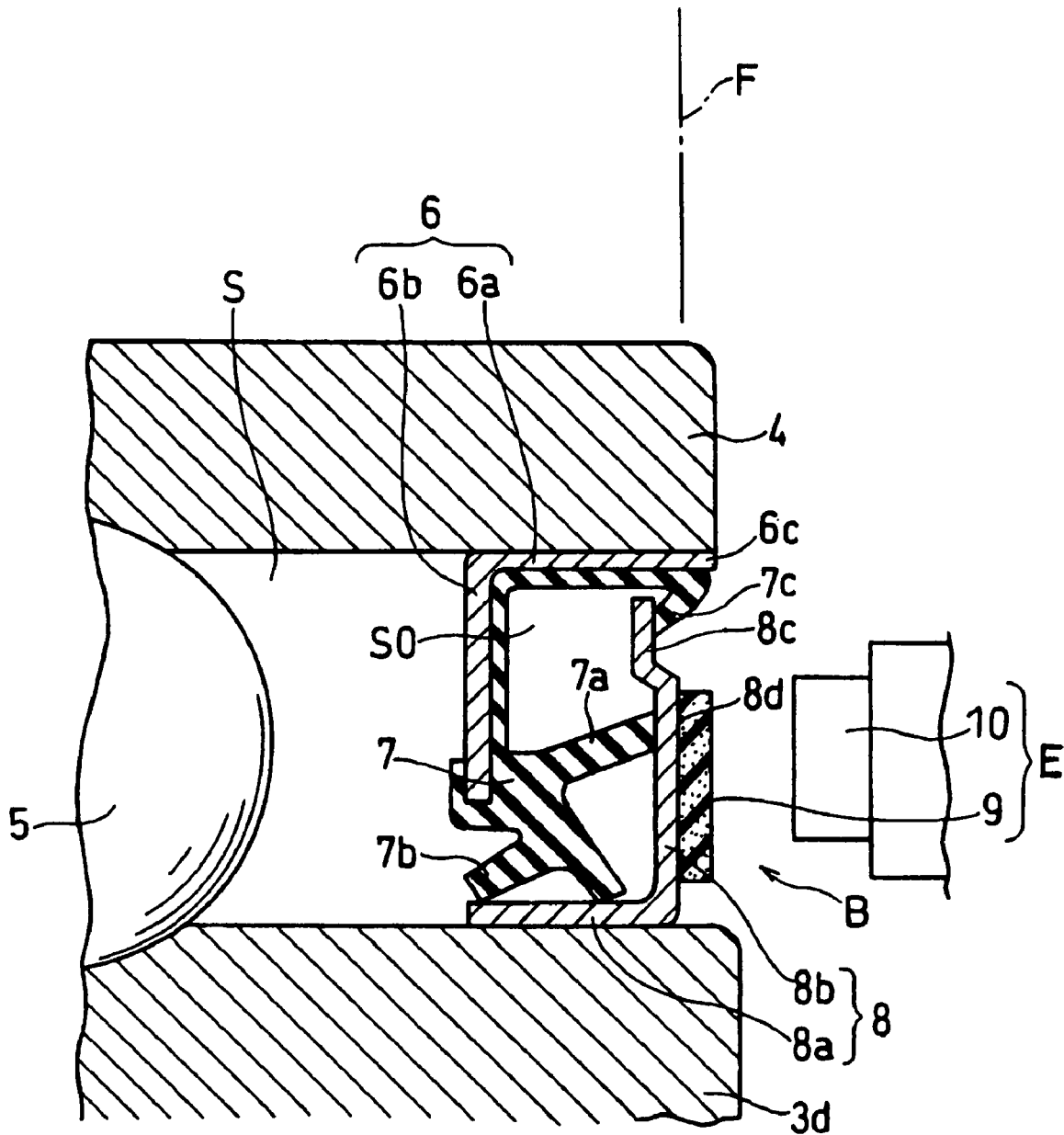
FIG. 3 shows the same portion as FIG. 2 of other preferable embodiment.
Figure 4:
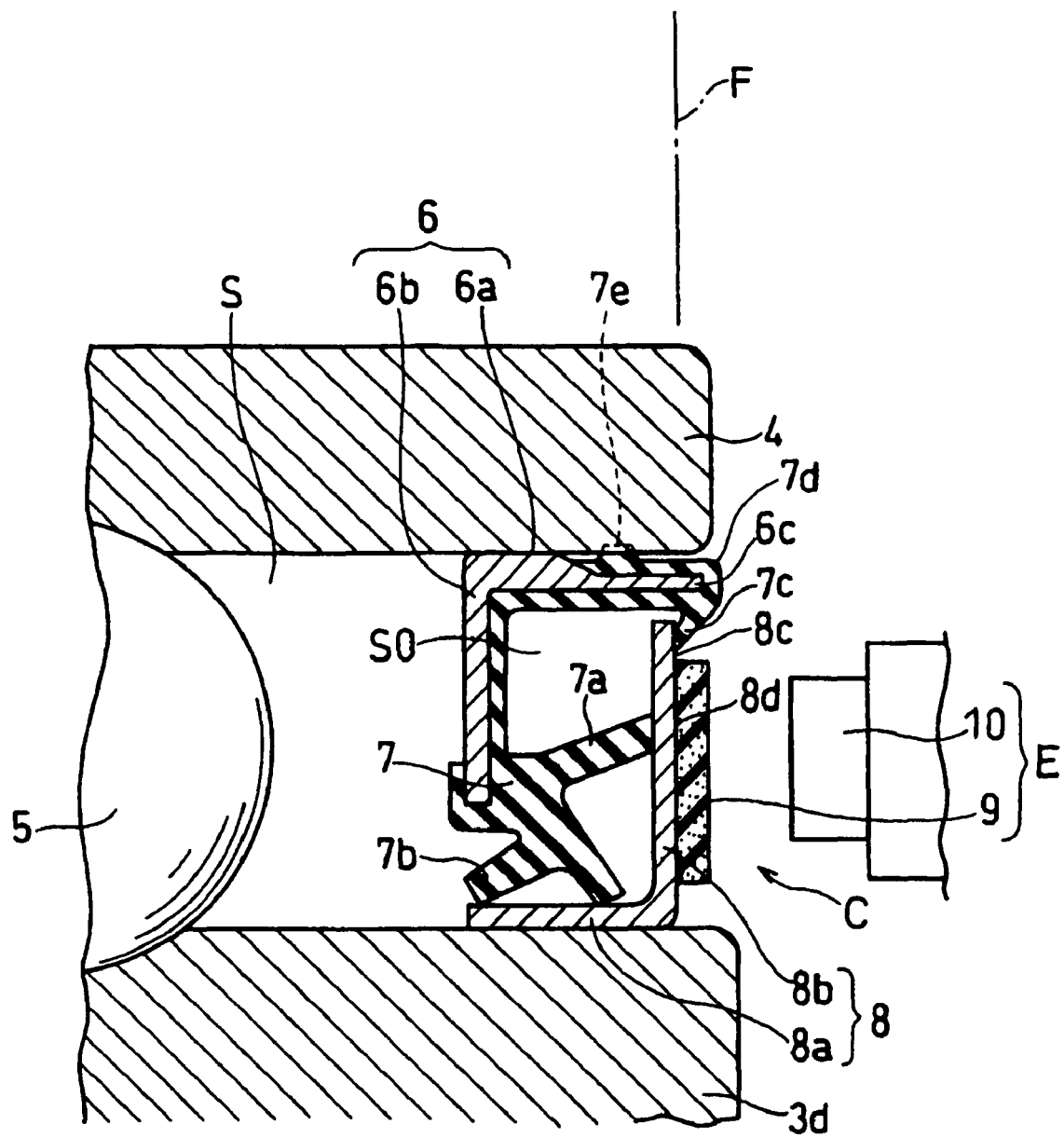
FIG. 4 shows the same portion as FIG. 2 of till other preferable

The preferred embodiments of the present invention are explained hereinafter referring to the attached drawings. FIG. 1 is a sectional view showing an example of a bearing unit incorporated with a sealing device of one preferable embodiment of the present invention, FIG. 2 is an enlarged view of the portion "X" in FIG. 1, FIG. 3 is a view similar to FIG. 2 showing other preferable embodiment, and FIG. 4 is a view similar to FIG. 2 showing still other preferable embodiment.

FIG. 1 shows one embodiment of the structure in which vehicle wheels are supported for a driving shaft 1 with a ball bearing unit 2. A tire wheel (not shown) is fixed to a hub wheel 3a constituting an inner ring (rotary member) 3 by means of a bolt 3b. The reference numeral 3c indicates a spline hole formed in the hub wheel 3a and the driving shaft 1 is spline fitted in the hole 3c and is integrally fixed to the hub wheel 3a, thereby transmitting the rotational drive force of the driving shaft 1 into the tire wheel via the hub wheel 3a. The reference numeral 3d indicates an inner ring member, which constitutes the inner ring 3 together with the hub wheel 3a.

The reference numeral 4 indicates an outer ring (stationary member) which is attached and fixed to the vehicle suspension (not shown). Two rows of rolling elements (ball) 5 . . . are interposed while being held with a retainer 5a between the outer ring 4 and the inner ring 3 (hub 3a and inner ring member 3d). The reference numerals A and A' indicate seal rings for preventing leakage of lubricant agent (grease and the like) charged in the rolling portion of the rolling elements 5 . . . and for preventing ingress of waste water and grist and dust from outside and they correspond to the sealing device of the present invention and are inserted under pressure between the outer ring 4 and the inner ring 3. The space surrounded with the seal rings A, A' at both sides, the inner ring 3 and the outer ring 4 constitute a sealed portion S.

Figure 2:
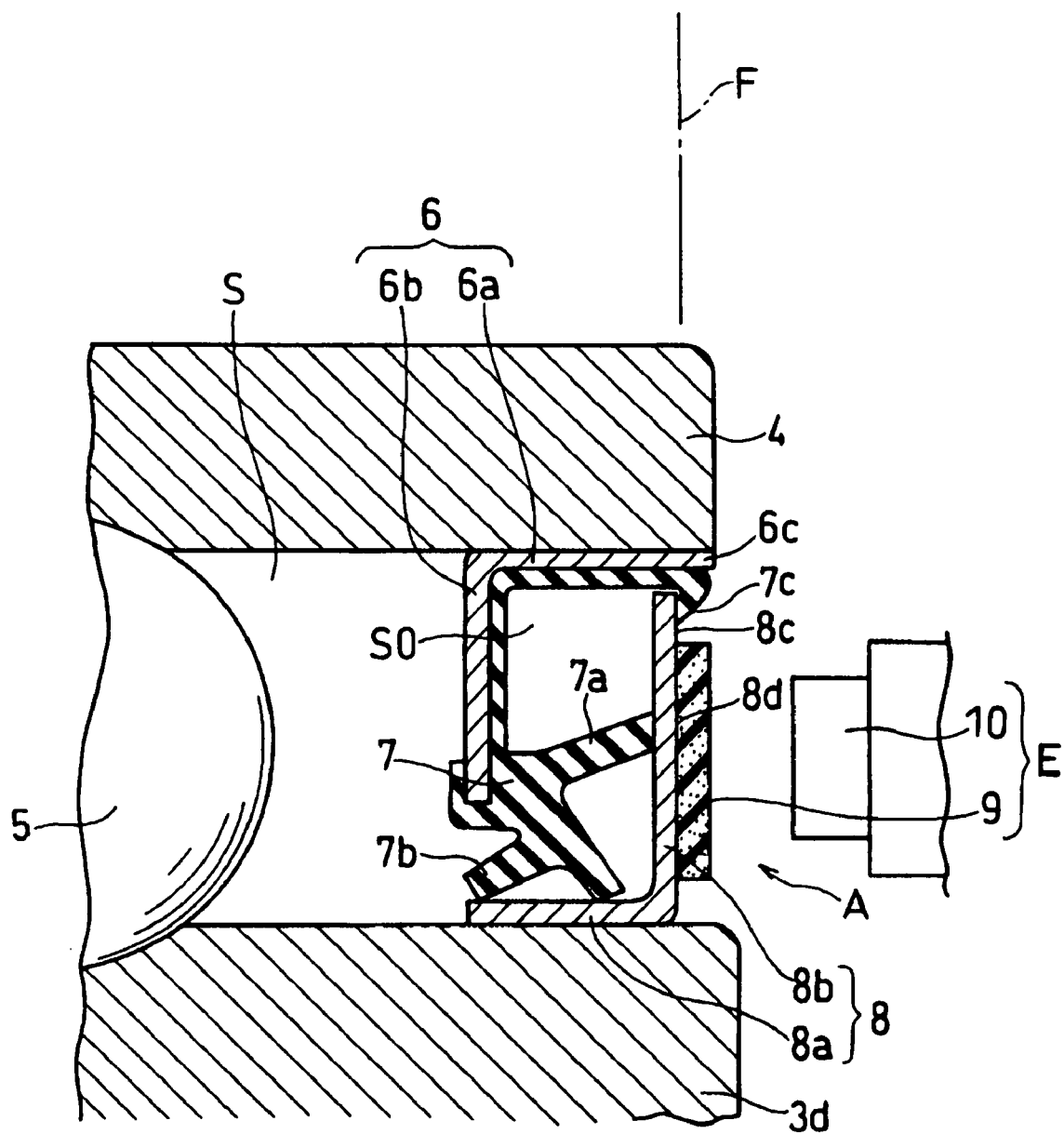
FIG. 2 is an enlarged view of the portion "X" in FIG. 1.

FIG. 2 shows an enlarged view of the part "X" in FIG. 1. The seal ring A at vehicle body side is constructed such that a ring-like core member 6 to be fitted under pressure in the inner circumference of the outer ring 4, an elastic seal member 7 made of an elastic material such as rubber and fixed to the core member 6, and a slinger 8 externally fitted in the outer circumference of the inner ring member 3d are assembled to form a pack-seal type seal ring as shown in the figure. The slinger 8 comprises a fitting cylindrical portion 8a externally fixed in the outer circumference of the inner ring member 3d and a flange like portion 8b extending outside relative to the sealed portion S into the radial direction (centrifugal direction) at an outer edge of the fitting cylindrical portion 8a.

At the vehicle side surface (the outer surface being positioned outside relative to the sealed portion) of the flange like portion 8b of the slinger 8, there are provided an attached surface 8d which is integrally attached with the tone wheel 9 and an extended end face 8c which is extended to the side of the outer wheel 4 without having the tone wheel 9, where the tone wheel 9 is made of magnetic rubber sheet in which magnetic powder such as ferrite is mixed in a rubber material, and the tone wheel 9 is magnetically formed with many magnetic N poles and S poles formed alternately in a circumferential direction in the tone wheel 9. At the vehicle body side (the stationary side), a magnetic sensor 10 is fixed as its detecting surface opposes to the tone wheel 9. Thereby the magnetic sensor 10 and the tone wheel 9 constitute the magnetic encoder E which detects the rotation number (rotation speed) of the objects such as a wheel.

The Sealing device A of the present invention is characterized in that the outer end 6c is positioned outside relative to the sealed portion S of the fitting cylindrical portion 6a of the core member 6, where the outer end 6c is formed so as to extend outside relative to the outer surface (F) of the flange like portion 8b of the slinger 8. The elastic seal member 7 which is fixed to the core member 6, comprises seal lip portions 7a, 7b formed so as to be elastically and slidably contact respectively with the inner face at the sealed portion S side of the outer flange portion 8b and the outer circumference face of the fitting cylindrical portion 8a. And the elastic seal member 7 is formed so as to contact with the fitting cylindrical portion 6a from the inner surface (the surface facing to the slinger 8) of the fitting cylindrical portion 6a of the core member 6 to the outer end 6c. At the end of the elastic seal member 7, a seal lip portion 7c is extendedly formed so as to contact elastically and slidably with the extended end face 8c of the flange like portion 8b of the slinger 8 from outside. Sealing device A of the present invention is characterized in that the seal lip portion 7c and the other seal lip portion 7a, both formed as mentioned above, clamp the flange like portion 8b from inside and outside thereof.

The core member 6 and the slinger 8 are obtained by sheet metal processing of the cold rolled steel sheet such as SPCC into the form shown in the figure. The magnetic rubber sheet constituting the seal member 7 or the tone wheel 9 is formed such that a rubber material selected from NBR, H-NBR, ACM, AEM, FKM and the like is integrally attached on the core member 6 or the slinger 8 by means of adhesive agent or at the same time of vulcanization molding to be integrated. As the rubber material for the latter, a ferrite magnetic powder or rare earth magnetic powder is mixed in advance as mentioned above.

According to the seal ring A mounted between the inner ring 3 and the outer ring 4, the slinger 8 axially rotates around the center of the driving shaft 1 following the axial rotation of the driving shaft 1 and the inner ring 3 while the seal lip portions 7a, 7b, 7c slidably contact with the inner face and the extended end face 8c of the slinger 8 in an elastic condition. At the same time the tone wheel 9 axially rotates around the center of the driving shaft 1, the magnetic sensor 10 detects the alternate magnetic change in the N poles and the S poles following the rotation of the tone wheel 9 and counts the pulse signals caused by the magnetic change, thereby calculating the rotary speed and so on of the driving shaft 1, namely the tire wheel (not shown).

The space portion SO formed by the slinger 8 and the core member 6 with the elastic seal member 7 is closed by the seal lip portion 7c which is positioned at the border of the slinger 8 and the core member 6 exposed to the exterior environment, so that the space portion SO becomes a completely closed space and the grist and dust cannot be entered into the space portion SO from outside. Further the seal lip portion 7c is formed like a tongue so as to project toward the slinger 8 and outside of the sealed portion S as mentioned above, and in addition to the fact that the outer end 6c of the fitting cylindrical portion 6a of the core member 6 is formed so as to project out of the line F, the prevention ability for the ingress of grist and dust from outside becomes strong and the prevention function is kept for a long time. Therefore, the grist and dust do not enter the space portion SO, so that they do not enter the elastically and slidably contacting portion of the seal lip portions 7a, 7b to the inside of the slinger 8, thereby keeping the sealing performance of the elastic seal member 7 and improving the durability.

Also because the sealing device A in which these core member 6, elastic seal member 7, slinger 8 are combined together as shown in FIG. 2, can be pushed and fixed with an appropriate jig or a tool in the direction of the white arrow in FIG. 1 between the inner wheel 3 and the outer wheel 4, so that the assembly becomes much easier.

Embodiment 2

The seal ring B (sealing device) in FIG. 3 is characterized in that the extended end face 8c of the flange like portion 8b of the slinger 8 is formed as a step portion which shifts to the sealed portion S closer than the attached surface 8d as shown in the figure. The seal lip portion 7c contacts with the step portion constituting the extended end face 8c elastically and slidably from outside. Therefore, the seal lip portion 7c which elastically and slidably contacts with the extended end face 8c can be assembled without touching the tone wheel 9. Also tone wheel 9 can be integrally attached with the attached surface 8d more easily because the surface to be attached with the tone wheel 9 can be recognized easily. Other structures and effects are the same as the above-mentioned embodiment, so the common members have the same reference numerals and their explanations are omitted here.

Embodiment 3

The seal ring C (sealing device) shown in FIG. 4 is characterized in that the base portion 7d of the seal lip portion 7c which elastically and slidably contacts with the extended end face 8c is formed so as to extend outside relative to the outer surface 9a of the tone wheel 9. Therefore the magnetic force of the tone wheel 9 can not make the sealing device C stick to each other, because the core member 6 does not touch the tone wheel 9 even if the sealing device C is contacted each other, so that the handling of the sealing device becomes easier. In addition, because the base portion 7d is formed so as to extend outside relative to the tone wheel 9, therefore the core member 6 and the tone wheel 9 do not touch each other even if the sealing device C is contacted each other as mentioned above, so that the damage of the tone wheel 9 is prevented. Moreover, because the base portion 7d of the seal lip portion 7c is formed so as to extend outside relative to the outer surface 9a of the tone wheel 9, the attack of the grist and dust which comes from outside is decreased even after the seal ring C is assembled, so that the durability of the sealing device is improved.

The structure of the sealing device C shown here in FIG. 4 is different from those shown in FIG. 2 and FIG. 3 in the point that the annular strip-like projection, so called nose potion 7e, is formed to the elastic seal member 7 in case of the sealing device C. The elastic seal member 7 shown in FIG. 4 is extended from the inner surface ( the surface facing to the slinger 8) of the fitting cylindrical portion 6a of the core member 6 to the outer circumference portion of the fitting cylindrical portion 6a so as to cover the outer end 6c, so that the nose potion 7e is formed on this outer circumference portion. Therefore, the surface of the inner circumferential entrance end of the outer wheel 4 can be shaped in various way. It is not necessary to mention that this composition above is applied not only for the sealing device C, but also is able to be applied for sealing device A and sealing device B. Other structures and effects are the same as the above-mentioned embodiment, so the common members have the same reference numerals and their explanations are also omitted here.

In the above-mentioned embodiments, the sealing device with tone wheel of the present invention is applied to the seal ring A at the vehicle body side shown in FIG. 1, however, it goes without saying that the sealing device can be applied to the seal device in which the surface area of the tone wheel facing to the magnetic sensor is covered with a covering member. Further, in the above-mentioned embodiments, the inner ring 3 is set as a rotary member and the outer ring 4 is set as a stationary member, however, they may be set vice versa, in such a case the direction of the flange like portion 8b of the slinger 8 and the inward flange portion 6b of the core member 6 are reversed respectively. Still further according to the above-mentioned embodiments, the sealing device of the present invention is applied to a bearing unit supporting the wheel shaft of the vehicle, however, it goes without saying that it can be applied to the other mechanism which requires sealing.

The invention claimed is:

1. A sealing device with tone wheel comprising a slinger fixedly fitted onto a rotary member, a core member fixedly fitted into a stationary member, and an elastic seal member attached to the core member, the elastic seal member having a plurality of seal lip portions elastically and slidably contacting with the slinger, thereby sealing a space to be sealed between the stationary member and the rotary member, in which said slinger has a first fitting cylindrical portion to be fitted onto said rotary member and a flange like portion disposed opposite to said space having an outer surface opposite to said space and extending in its radial direction from an outer edge of said first fitting cylindrical portion, comprises;

an attachment surface to which said tone wheel is attached, and an extended surface to which said tone wheel is not attached, extending in the direction of said stationary member, wherein, said core member has at least a second fitting cylindrical portion to be fitted into said stationary member, whose outer end opposite to said space projects outwardly beyond said outer surface of said first fitting cylindrical portion of said slinger, and one of said plurality of said seal lip portions has an end which contacts elastically and slidably with said extended surface in such manner that the end returns toward said space, whereby said flange like portion is clamped by one of said plurality of seal lip portions outside and inside thereof, and wherein the base portion of said seal lip portion which elastically and slidably contacts with said extended surface has a projected portion which projects axially outside relative to the outer surface of said tone wheel.

2. The sealing device with tone wheel as set forth in claim 1, wherein said extended surface of said flange like portion of said slinger has a step portion which bends toward said space so as to be away from said attachment surface.

* * * * *